United States Patent [19]

Briskman

[11] Patent Number: 6,023,616
[45] Date of Patent: *Feb. 8, 2000

[54] SATELLITE BROADCAST RECEIVER SYSTEM

[75] Inventor: Robert D. Briskman, Bethesda, Md.

[73] Assignee: CD Radio Inc., Bethesda, Md.

[*] Notice: This patent is subject to a terminal disclaimer.

[21] Appl. No.: 09/037,926

[22] Filed: Mar. 10, 1998

[51] Int. Cl.⁷ .................................................. H04B 1/00
[52] U.S. Cl. ......................... 455/344; 455/3.2; 455/11.1
[58] Field of Search ............................. 455/345, 99, 575, 455/11.1, 3.2; 343/700 MS, 713, 715

[56] References Cited

U.S. PATENT DOCUMENTS

| | | |
|---|---|---|
| 2,959,644 | 11/1960 | Grace . |
| 3,163,820 | 12/1964 | Hight . |
| 3,825,837 | 7/1974 | Briskman . |
| 3,836,969 | 9/1974 | Bond et al. . |
| 3,995,111 | 11/1976 | Tsuji et al. . |
| 4,021,737 | 5/1977 | Trask . |
| 4,038,600 | 7/1977 | Thomas . |
| 4,286,262 | 8/1981 | Wahl . |
| 4,291,409 | 9/1981 | Weinberg et al. . |
| 4,291,410 | 9/1981 | Caples et al. . |
| 4,502,051 | 2/1985 | Dondl . |
| 4,532,635 | 7/1985 | Mangulis . |
| 4,535,476 | 8/1985 | Carlin . |
| 4,560,945 | 12/1985 | Olver . |
| 4,588,958 | 5/1986 | Katz et al. . |

(List continued on next page.)

FOREIGN PATENT DOCUMENTS

| | | |
|---|---|---|
| 358019782A | 7/1981 | Japan . |
| 62-58732 | 3/1987 | Japan . |
| 5-055978 | 3/1993 | Japan .............................. H04B 7/26 |
| 5-183327 | 7/1993 | Japan .............................. H01Q 13/08 |
| 4-199153 | 8/1993 | Japan .............................. H04B 7/26 |
| 2098821 | 11/1982 | United Kingdom . |
| WO 91/07025 | 5/1991 | WIPO . |

OTHER PUBLICATIONS

Razavi, Behhzad "RF Microelectronics," ISBN 0–13–887571–5, Nov. 1997.

Institute of Electrical and Electronics Engineers, Inc.; Time–Diversity Scheduled Retransmission Multiaccess Protocols for Satellite Networks, 1991, i–ii and 1544–1548.

Robert D. Briskman, Dar Mobile Demonstration, 1994, cover page, 1145–1151.

Hajime Fukuchi, Slant Path Attenuation Analysis at 20 GHz for Time–Diversity Reception of Future Satellite Broadcasting, unknown, 6.5.1–6.5.4.

Takeshi Hattori et al., Theoretical Studies of a Simulcast Digital Radio Paging System Using a Carrier Frequency Offset Strategy, 1980, 87–95.

P.A. Ratliff, UHF Satellite Sound Broadcasting Technology, 1988, 0141–0146.

K. Galligan et al., Opportunities for Sound Broadcasting Using Non–Geostationary Satellites, 1991, 64–76.

Robert D. Briskman, Montreux 1998, Engineering Symposium Record, 4th Edition, Jun. 1998, cover page, pp. 46–55.

Annex 1 to (Doc. 2–2/TEMP/18(Rev.2)), System Parameters Relevant to Sharing Studies of Proposed BSS(S) and BS(S) Systems.

*Primary Examiner*—Reinhard J. Eisenzopf
*Assistant Examiner*—Makoto Aoki
*Attorney, Agent, or Firm*—Patrick F. Bright

[57] ABSTRACT

A broadcast receiving system for use with an FM radio transmitter in a vehicle includes an adapter unit and an antenna unit. The adapter unit includes a connector to a vehicle's existing power system, e.g., cigarette lighter receptacle. The adapter unit receives audio program signals from the antenna unit, and retransmits them to a vacant FM channel or to an intermediate frequency channel of the vehicle's FM radio receiver. The antenna unit receives radio broadcast signals having frequencies in the range of about 300 MHZ to about 4000 MHz from satellites and terrestrial repeaters.

17 Claims, 3 Drawing Sheets

U.S. PATENT DOCUMENTS

| | | |
|---|---|---|
| 4,630,058 | 12/1986 | Brown . |
| 4,640,987 | 2/1987 | Tsukada et al. . |
| 4,652,884 | 3/1987 | Starker . |
| 4,660,196 | 4/1987 | Gray et al. . |
| 4,685,133 | 8/1987 | Iggulden . |
| 4,712,250 | 12/1987 | Michels et al. . |
| 4,720,873 | 1/1988 | Goodman et al. . |
| 4,731,866 | 3/1988 | Muratani et al. . |
| 4,742,410 | 5/1988 | Smith . |
| 4,801,940 | 1/1989 | Ma et al. . |
| 4,823,341 | 4/1989 | Rosen . |
| 4,829,570 | 5/1989 | Schotz . |
| 4,831,619 | 5/1989 | Rosen . |
| 4,879,711 | 11/1989 | Rosen . |
| 4,901,307 | 2/1990 | Gilhousen et al. . |
| 4,908,847 | 3/1990 | Hannon et al. . |
| 4,910,792 | 3/1990 | Takahata et al. . |
| 4,943,808 | 7/1990 | Dulck et al. . |
| 5,015,965 | 5/1991 | Katz et al. . |
| 5,017,926 | 5/1991 | Ames et al. . |
| 5,036,523 | 7/1991 | Briskman . |
| 5,038,341 | 8/1991 | Berman et al. . |
| 5,048,118 | 9/1991 | Brooks et al. . |
| 5,073,900 | 12/1991 | Mallinckrodt . |
| 5,093,839 | 3/1992 | Kohno et al. . |
| 5,126,748 | 6/1992 | Ames et al. . |
| 5,138,275 | 8/1992 | Abbiati et al. . |
| 5,148,452 | 9/1992 | Kennedy et al. . |
| 5,153,598 | 10/1992 | Alves, Jr. . |
| 5,155,494 | 10/1992 | Bryant et al. . |
| 5,175,557 | 12/1992 | King et al. . |
| 5,203,018 | 4/1993 | Hirose . |
| 5,233,626 | 8/1993 | Ames . |
| 5,239,670 | 8/1993 | Schwendeman et al. . |
| 5,251,328 | 10/1993 | Shaw . |
| 5,274,840 | 12/1993 | Schwendeman . |
| 5,278,863 | 1/1994 | Briskman . |
| 5,283,780 | 2/1994 | Schuchman et al. . |
| 5,303,393 | 4/1994 | Noreen et al. . |
| 5,319,673 | 6/1994 | Briskman . |
| 5,319,716 | 6/1994 | McGeevy ............................. 455/345 |
| 5,326,054 | 7/1994 | Turner . |
| 5,345,244 | 9/1994 | Gildea et al. . |
| 5,349,606 | 9/1994 | Lovell et al. . |
| 5,408,686 | 4/1995 | Mankovitz . |
| 5,408,699 | 4/1995 | Yamashita et al. ..................... 455/274 |
| 5,433,726 | 7/1995 | Horstein et al. . |
| 5,439,190 | 8/1995 | Horstein et al. . |
| 5,448,757 | 9/1995 | Hirata . |
| 5,485,485 | 1/1996 | Briskman et al. . |
| 5,500,856 | 3/1996 | Nagase et al. . |
| 5,507,454 | 4/1996 | Dulck . |
| 5,508,756 | 4/1996 | Landy et al. . |
| 5,509,028 | 4/1996 | Marque-Pucheu . |
| 5,526,284 | 6/1996 | Mankovitz . |
| 5,535,430 | 7/1996 | Aoki et al. ............................. 455/552 |
| 5,551,065 | 8/1996 | Honore . |
| 5,582,367 | 12/1996 | Castiel et al. . |
| 5,592,471 | 1/1997 | Briskman . |
| 5,600,333 | 2/1997 | Justice et al. ........................ 343/713 |
| 5,613,194 | 3/1997 | Olds et al. ............................ 455/12.1 |
| 5,628,049 | 5/1997 | Suemitsu .............................. 455/11.1 |
| 5,641,134 | 6/1997 | Vatt . |
| 5,652,765 | 7/1997 | Adachi et al. . |
| 5,669,585 | 9/1997 | Castiel et al. . |
| 5,678,175 | 10/1997 | Stuart et al. . |
| 5,794,138 | 8/1998 | Briskman .............................. 455/344 |
| 5,867,794 | 2/1999 | Hayes et al. .......................... 455/557 |

SATELLITE BROADCAST RECEIVER SYSTEM

BACKGROUND OF THE INVENTION

The use of satellites to broadcast radio programs for reception in automobiles, trucks, vans and other mobile platforms has been widely proposed for implementation (see *Report and Order*, Federal Communications Commission, GEN Docket No. 90-357, Released Jan. 18, 1995). The transmissions from the satellites containing the radio programs are today at frequencies between about 300 MHZ and about 4000 MHZ which are much higher in frequency than those used today for transmission of radio programs such as amplitude modulation (AM) transmission or frequency modulation (FM) transmission. The satellite transmission may be from one or more satellites and from one or more terrestrial repeaters of the satellite transmission in areas where the terrain or man-made structures prohibit good visibility from the automobiles to the satellite(s).

To receive the satellite and terrestrial transmissions in the mobile platforms (i.e., automobiles, trucks, etc.), the mobile platform requires an appropriate radio. Until this relatively new satellite transmission service becomes widely used, which will require several years, automobile manufacturers are unlikely to provide the capability to receive such satellite/repeater transmissions in radios delivered with new cars. This means that potential customers with old cars and with future factory delivered cars desiring such new transmission services must replace their existing radios with new radios which include the capability to receive these transmissions. This is expensive and time consuming, since the removal of the old radio and installation of the new radio must be done by trained technicians at a technical facility. This invention provides a system to add a satellite/terrestrial repeater transmission receiver to existing mobile platform radios quickly and easily by anyone.

The invention is, in part, related to inventions disclosed and claimed in U.S. Pat. No. 5,278,863 which issued on Jan. 11, 1994 and U.S. Pat. No. 5,319,673 which issued on Jun. 7, 1994, both patents entitled "RADIO FREQUENCY BROADCASTING SYSTEMS AND METHODS USING TWO LOW-COST GEOSYNCHRONOUS SATELLITES"; U.S. Pat. No. 5,485,485 which issued on Jan. 16, 1996 entitled "RADIO FREQUENCY BROADCASTING SYSTEMS AND METHODS USING TWO LOW-COST GEOSYNCHRONOUS SATELLITES AND HEMISPHERICAL COVERAGE ANTENNAS"; and U.S. Pat. No. 5,592,471 which issued on Jan. 7, 1997 entitled "MOBILE RADIO RECEIVERS USING TIME DIVERSITY TO AVOID SERVICE OUTAGES IN MULTICHANNEL BROADCAST TRANSMISSION SYSTEMS". The invention is also, in part, related to the inventions disclosed and claimed in U.S. patent application Ser. No. 08/815,619, filed Feb. 26, 1997 in the PTO, and entitled "Simply Installed Automotive Satellite Broadcast System Receiver." The contents of these patents and of this patent application are incorporated herein by reference as though fully set forth here.

SUMMARY OF THE INVENTION

Satellite systems are being implemented which transmit multichannel radio broadcast programs directly to mobile platforms. Radios in the platforms must be modified or augmented to accept such transmissions. This invention provides a system that includes an adapter unit that is connectable to the cigarette lighter of a vehicle such as an auto or truck. The adapter receives translated satellite/terrestrial transmissions from an antenna unit and transmits such programs to an FM radio transmitter and, more particularly, to a desired, vacant frequency band or intermediate frequency band of the FM radio, and, from there, to a speaker system connected to the FM radio. The system also includes an antenna unit to receive the satellite/terrestrial transmission(s) and retransmit them to the adapter. The antenna unit can be mounted on the platform, or can replace an existing cellular antenna.

The receiver augmentation system permits the platform (automobile, truck, RV, boat, light plane, etc.) operator to link additional equipment to the existing platform's radio which allows it to receive transmissions from satellite radio broadcasting systems, typically operating in the radio frequency range of about 300 MHZ to about 4000 MHZ, and preferably in the range of about 800 MHZ to about 4000 MHZ, as well as normal FM (and, if desired, AM) transmissions at lower radio frequencies. The satellite radio broadcasting system's transmissions may come from one or more satellites and/or from one or more terrestrial repeaters of the satellite transmissions. This system can be installed on any existing platform radio which includes an FM radio receiver and a power source for the adapter unit, e.g., a cigarette lighter. The installation requires no wiring or rewiring to any vehicle subsystem and can be done by all platform operators without the need for training.

The adapter unit includes a power cord connectable to a power source, e.g., a vehicle's cigarette lighter, and a program display, preferably an LCD display, that shows program data such as channel number, type of music, name of composition, composer, etc. Some of this data may be shown sequentially. A few controls, such as channel selection, may also be mounted on the display. The display's size and shape are chosen so that access to existing controls on an existing FM radio is unobstructed.

The adapter unit receives satellite system broadcast transmission(s) as a re-transmission from the antenna unit, described below, at a translated frequency via an antenna on or in the adapter unit. Behind the adapter unit's display are one or more electronic chips which amplify, demodulate and control the received signal(s), as well as provide data and electronic drives for the display. One primary output signal from the chips is the audio, either music or voice, which radiates the audio signal to the platform's FM radio transmitter, e.g. to a vacant portion of the FM frequency band or to an intermediate frequency (IF) band of the FM radio. The audio signal then passes through the FM radio's audio amplification subsystem to existing speakers.

Tuning the existing FM radio in the vehicle to a vacant portion of the FM spectrum can be accomplished manually by a vehicle operator or passenger. Tuning can also be done automatically, by including in the adapter an FM receiver which scans the FM spectrum for a vacant portion, and, after finding such a vacant portion, tunes the FM radio in the adapter to that frequency. The FM radio then monitors that frequency, either directly, by measuring the desired signal to noise ratio, or indirectly, by measuring unwanted sideband energy. The FM radio senses the interfering presence, if any, of an FM broadcast on the previously vacant portion of the spectrum. The FM radio then searches for a new, vacant portion of the FM frequency band and retunes the FM radio in the adapter to that frequency.

The antenna unit includes an element which receives the satellite system's broadcast transmissions, a radio frequency translator and an element which re-radiates the amplified signal to the adapter unit. The antenna unit is preferably mounted on the outer surface of the mobile platform. For a metal car, the mounting may be made to the outer surface of a window. As an example, one configuration would be a silver dollar-sized disk for receiving satellite system transmissions atop a cellular telephone, rear-window-mounted antenna. Below the disk is a small, cone-shaped electronics housing whose outer surface is also used for the re-transmission antenna. This configuration allows simultaneous cellular telephone operation and satellite broadcast reception without the need for a second mobile platform antenna. Power for the antenna unit is supplied by its internal battery recharged from solar cells or by radiated power from the adapter unit.

The preferred embodiments of this system receive satellite and terrestrial repeater transmissions containing multi-program audio material when used in vehicles having FM radios and one or more auxiliary power ports, e.g., cigarette lighter receptacles. The majority of vehicles in the United States, e.g. automobiles, trucks, vans, and sport utility vehicles contain such FM radios, and one or more such ports.

BRIEF DESCRIPTION OF DRAWINGS

The apparatus and methods of this invention can better be understood by reference to the drawings, in which.

DETAILED DESCRIPTION OF PREFERRED EMBODIMENTS

Figure 1A:
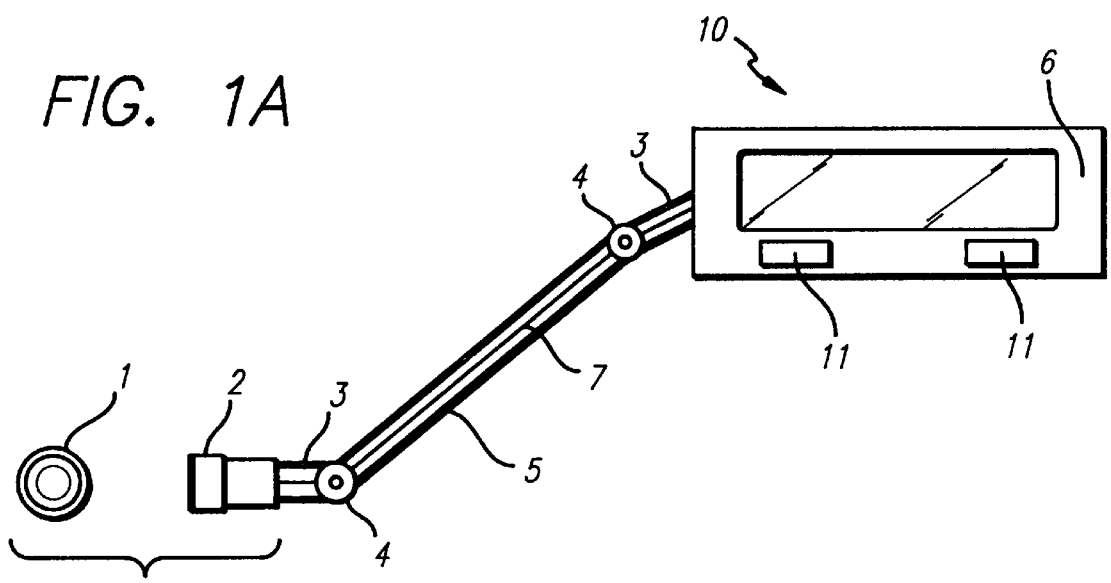
FIG. 1A shows a schematic diagram of an embodiment of the adapter unit.

In preferred embodiments, the apparatus comprises two units, an adapter unit and an antenna unit. FIG. 1A shows a physical depiction of adapter unit 10 that is suitable for use in a vehicle with an FM radio. Adapter unit 10 receives satellite signals retransmitted by the antenna unit, described below. The desired audio program modulates an FM transmitter tunable to a vacant portion of the FM band or to an IF band in a vehicle's existing FM radio system. The vehicle operator inserts adapter unit 10 into cigarette lighter receptacle 1, turns on the existing FM radio in the vehicle (not shown), tunes the existing FM radio to a desired vacant frequency band, and selects a desired satellite-delivered audio program by manipulating controls 11 on adapter unit 10. Adapter unit 10 receives electrical power from cigarette lighter receptacle 1. Commercial devices are available to convert a one-receptacle cigarette lighter to a multi-receptacle cigarette lighter if the vehicle operator needs a cigarette lighter receptacle to power devices other than adapter unit 10.

In FIG. 1A, automobile cigarette lighter receptacle 1 is connected to adapter mounting arm 3, 4, 5 via standard cigarette lighter plug 2. Adapter mounting arm 3, 4, 5 permits a user to position adapter unit 10, with its display 6 and controls 11, at a convenient, free-standing location for viewing and operation by a vehicle driver or passenger. The mounting arm includes two shorter portions 3 joined to a longer portion 5 by elbow joints 4, which allow relative rotation of these arm portions. Electricity to power the display, electronics and controls in adapter unit 10 comes from cigarette lighter receptacle 1 through plug 2, and passes through the power interconnect wires 7 in mounting arm 3/4/5 to adapter unit 10. Other mounting arm mechanical configurations are feasible including flexible coiled cables from the cigarette lighter receptacle 1 to adapter unit 10. In such cases, adapter unit 10 may not be freestanding and, if not, may be affixed to a vehicle by hooks, velcro strips, clips or other means.

Adapter unit 10 includes display 6 with tuning controls 11. The size of display 6 depends on the quantity of program information to be displayed, the need for good visibility of this information, and the need to avoid blocking access to existing FM radio controls, or to surrounding instrument panel controls. A 10 by 4 cm LCD display would be adequate in many vehicles. Controls 11 can be mounted elsewhere on display 6, and can be of many types, e.g., pressure sensitive or voice activated.

In preferred embodiments, adapter unit 10 includes its own antenna to receive re-transmissions from the antenna unit of FIG. 2. Depending on the frequency chosen for the re-transmission, a loop, bow-tie or loaded dipole antenna may be used. Likewise, energy may be radiated from the adapter unit to power the antenna unit or from other elements in the adapter.

Figure 1B:
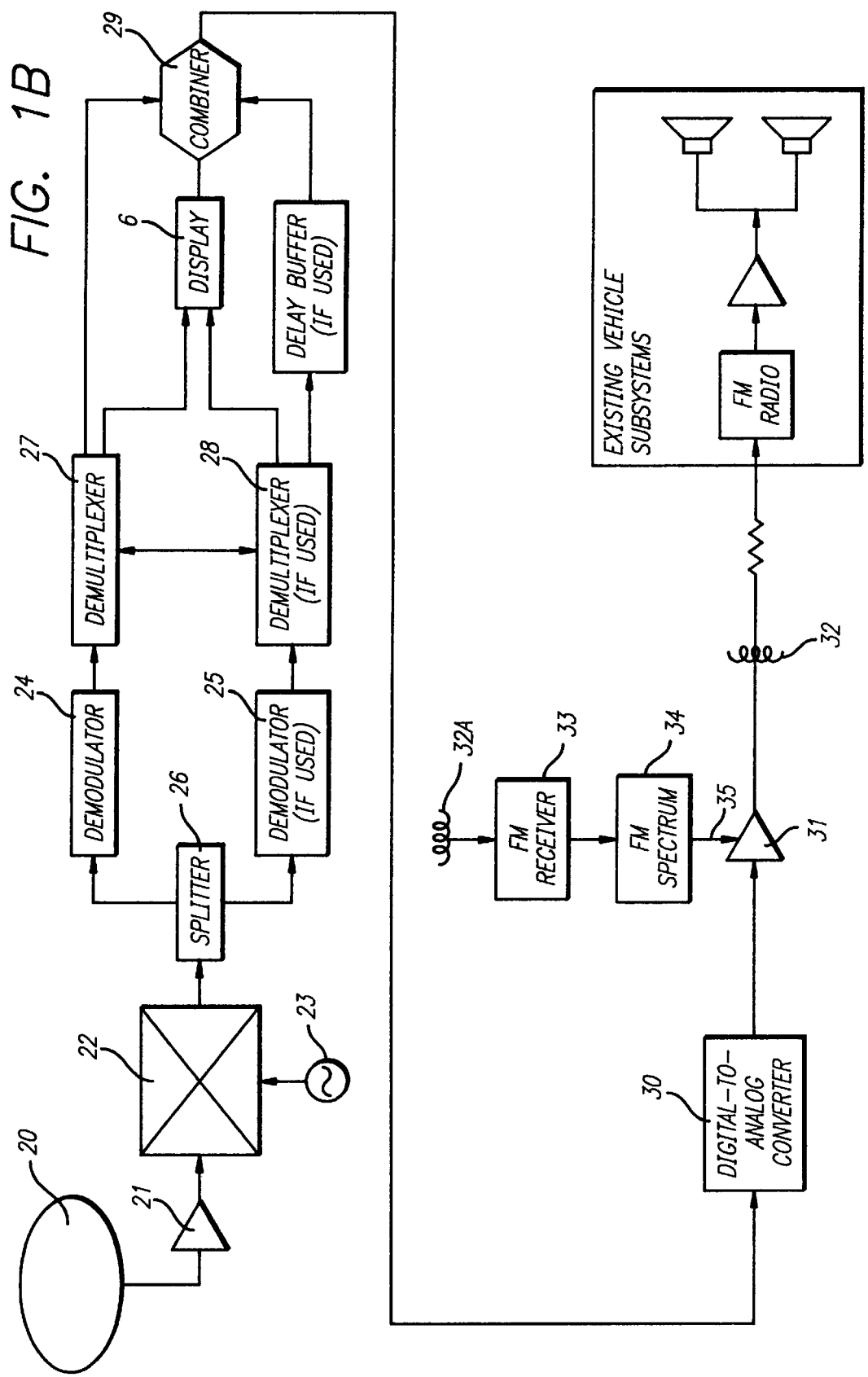
FIG. 1B shows a block function diagram of an embodiment of circuitry for use in the adapter unit shown in FIG. 1A.

FIG. 1B shows electronic circuitry for use in adapter unit 10. Re-transmissions are received by antenna 20, amplified by amplifier 21, and down-converted by converter 22 and associated oscillator 23, as required, to the input frequency of demodulators 24 and 25. As discussed below, the down conversion may be accomplished in the antenna unit. FIG. 1B shows the use of two demodulators following splitter 26 which is typical of satellite radio transmission systems using space, frequency or time diversity. If diversity is not employed, only one demodulator is needed. Conversely, more than two demodulators can be used for higher order diversity. It is also feasible to digitize the incoming signal after amplification and then carry out the electronic functions by digital signal processing (DSP).

The output of demodulators/decompressors 24 and 25 are fed to demultiplexers 27 and 28, if several programs have been combined in the signal. The desired program channel is then selected by operator activation of a control. Signal combination at combiner 29 occurs next, typically using a maximal ratio combiner or selection by signal strength, followed by conversion at digital-to-analog converter 30, if the signal is digital, to analog. Finally, the analog program is delivered to FM modulator/transmitter 31.

Transmitter/modulator 31 sends the signals to antenna 32 in adapter unit 10. This antenna radiates the signals to the vehicle's existing FM radio which processes these signals as it would process ordinary FM transmissions. The level of the transmission is sufficient to penetrate an FM radio with minimal interference. The FM radio delivers these signals to the existing amplifiers and loudspeakers in the platform. Demultiplexers 27 and 28 also remove the program data (i.e., channel, music type, composer, etc.) from the desired program channel or from an auxiliary service channel, and send the data to display 6 (See FIG. 1A).

An additional FM antenna 32A, FM receiver 33, and means 34 for finding a vacant portion of the FM spectrum and for tuning the FM modulator/transmitter 31 frequency to that portion can be included in the adapter for automatic, continuous selection of an appropriate FM transmit frequency for the adapter instead of manually tuning the vehicle's existing FM radio. It is also feasible to combine the two FM antennas 32 and 32A in the adapter using a diplexer and to have the FM receiver in the adapter monitor the vacant portion of the spectrum so that, if it subsequently becomes occupied by a broadcast station, another vacant portion of the FM spectrum can then be found and assigned to the adapter's FM modulator/transmitter.

Figure 2A:
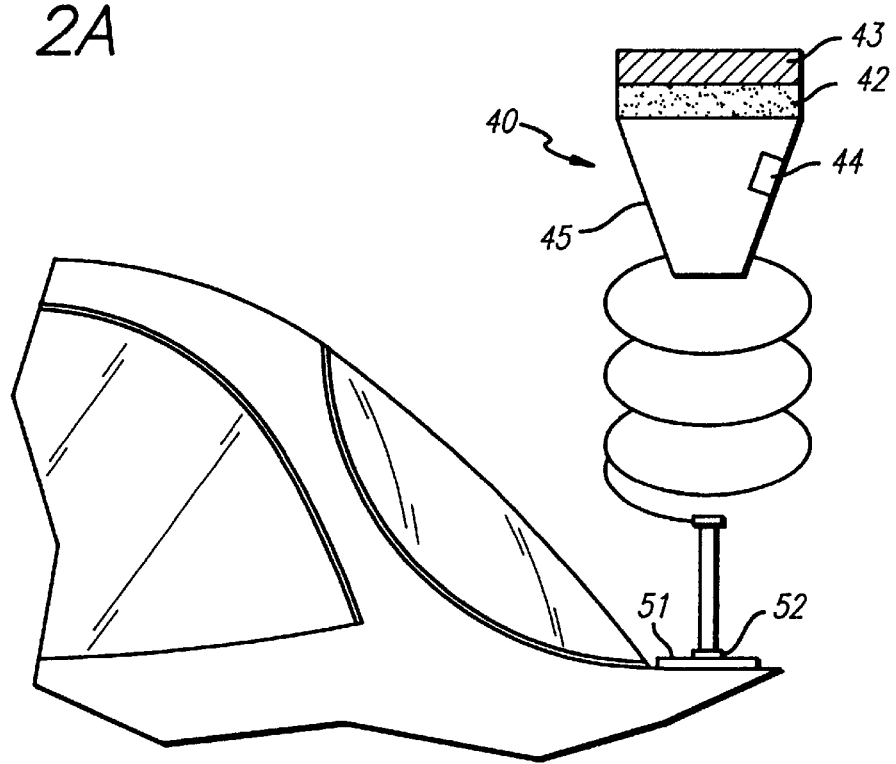
FIGS. 2A and 2B show two embodiments of antenna units.
Figure 2B:
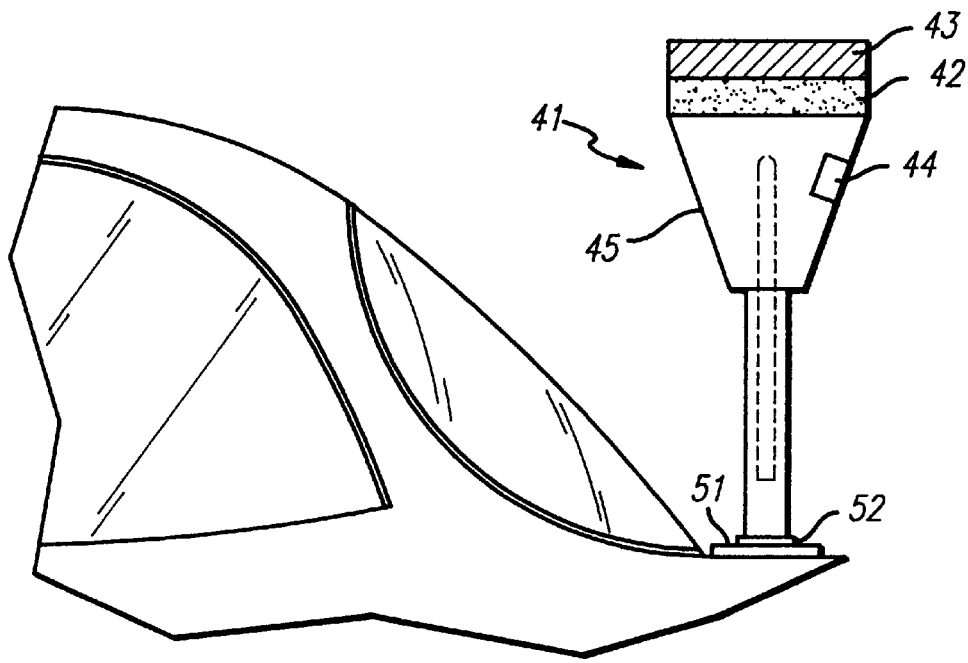

FIGS. 2A and 2B show two mounting configurations of antenna units 40 and 41 for vehicles. Numerous mounting configurations are feasible so long as the top portion of the unit has clear visibility of the sky, and the lower portion of the unit has visibility of the adapter unit. FIG. 2A shows a combined cellular telephone and satellite system antenna installation. FIG. 2B shows a stand-alone satellite system antenna installation. In FIGS. 2A and 2B, the only installation required is to affix, e.g., glue the antenna unit to the rear window of a vehicle so that the top of the unit is above the vehicle roofline.

Both configurations show a band of solar cells 42 just below the satellite system receiving antenna 43 for use in embodiments where the antenna unit is powered by battery 44 and where solar cells 42 are used to recharge battery 44. Below the solar cell band is a conical housing 45 for the electronics. Elements in the housing surface are used as an antenna to re-radiate the transmissions received from the satellite/terrestrial repeaters to the adapter unit.

Figure 2C:
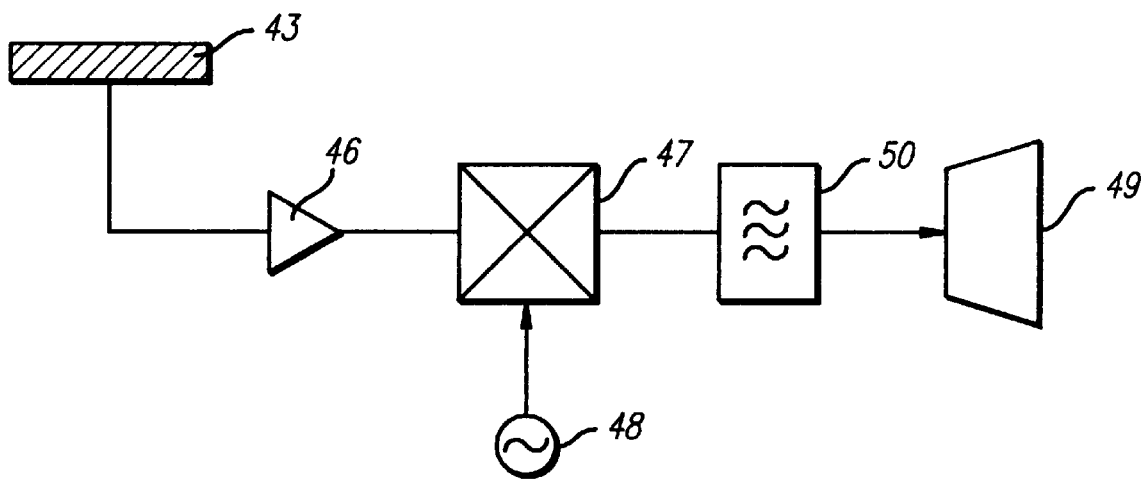
FIG. 2C shows a block function diagram of circuitry for use in the antenna units shown in FIGS. 2A and 2B.

FIG. 2C shows the electronic configuration of the antenna unit. The transmissions from the satellites and terrestrial repeaters are received by satellite system receiving antenna 43 e.g., a patch or planar array circular disk, and applied to radio frequency amplifier 46 followed by frequency converter 47 with associated oscillator 48 which changes the frequency to that chosen for re-radiation from the antenna unit to the adapter unit. The signal is sent to the adapter unit via filter 50 by re-radiator antenna 49 in the conical electronics housing. The antenna type depends on the frequency chosen for re-radiation. Some useful types are slot, helix, and loaded dipoles.

The antenna unit is preferably mounted on the rear window of an automobile, e.g., using an adhesive. The adhesive is placed between the outside glass and small plastic mounting plate 51 (see FIG. 2) on the bottom of the antenna unit. The mounting is such that at least the top of the antenna unit containing the satellite receiving antenna is above the metal roof of the automobile. FIG. 2 shows the antenna unit arm attached to the mounting plate by pivot 52. This allows downward rotation of the antenna unit so it lies against the window during carwashes or allows its removal by pressure on the pivot joint's ears. Alternatively, a fixed mount can be used. Other embodiments noted earlier are the combination of the antenna unit arm with a cellular car antenna which may be mounted in a similar position on a vehicle's rear window.

The user turns on the antenna unit by inserting a battery into the electronics housing cone (see FIG. 2) or by a standard on-off switch if a pre-installed battery is used. The battery is periodically recharged through solar cells mounted near the upper rim of the electronics housing cone. Since the electrical power required by the antenna unit electronics is very small, it is alternatively feasible to radiate energy from the adapter unit to the antenna unit using frequencies such as those in the ISM (Industrial, Scientific, Medical) radio frequency bands. The ISM transmission from the adapter unit is received by elements in electronics housing cone 45 of the antenna unit, the signal is routed to a rectifier, and the resulting power used by the antenna unit's amplifier and up/down frequency converter.

The antenna unit receives the transmissions from the satellite(s) and from terrestrial repeaters of the satellite signal. The satellite system receiving antenna shown in FIG. 2 is a disk shaped planar array which provides an approximately hemispherical coverage with typically 2–4 dBi of gain throughout the elevation angles of about 20° to about 60° over all azimuth angles. The output of this antenna is connected to a miniaturized microwave monolithic integrated circuit (MMIC) radio amplifier. Such radio amplifiers provide low noise reception (0.3 dB noise figure typically) using a surface area less than 4×8 $mm^2$. The output of the amplifier is sent to a frequency converter which changes the radio frequency of the received satellite/terrestrial repeater transmissions from that used, e.g. about 300–4000 MHZ, preferably about 2332 MHZ, to the frequency desired for use in sending the transmission from the antenna unit to the adapter unit. The radio frequency chosen can be set by the up/down frequency converter to any desired band in the range of about 40–4000 MHZ. For the preferred embodiment, 150 MHZ is illustrated since the frequency range 100–500 MHZ often eliminates the need for a frequency converter in the receiver unit. The output power from the frequency converter in the antenna unit is radiated to the adapter unit by elements in the electronics cone and, for longer wavelengths, in the surface of the arm. The wavelength at 150 MHZ is 2 meters and a suitable radiating antenna is a loaded, folded quarter-wave dipole. Assuming the separation of the antenna unit and adapter unit is 4 meters or less, the radiating antenna and receiving antenna each have effective gains of only 3 dBi each (6 dBi total), the obstruction and reflection losses are 8 dB, the adapter unit system total noise temperature is 400° Kelvin, and the allowed degradation of the satellite/repeater transmission by re-transmission between the antenna unit and adapter unit is 0.1 dB, the radio frequency power required from the frequency converter in the antenna unit can be calculated as −78.3 dBW (less than a microwatt). Consequently, the electrical power can be supplied by an internal battery for a long time period. This period can be extended by use of solar cells mounted around the top of the antenna unit. The solar cells, when exposed to sunlight, recharge the battery. The antenna unit can also be electrically powered by radiation from the adapter unit as previously described since its electrical power requirements are small.

The activation of the adapter unit causes the display to show data on either a pre-programmed audio channel, or on the last channel to which the operator had listened. The display provides the channel number, type of audio and pertinent descriptive information. Simultaneously, the audio program plays through the existing vehicle radio sound subsystem. The operator may use pushbutton controls on the adapter unit display for other functions such as changing the channel to another program.

Electronically, the satellite and terrestrial repeater re-transmissions from the antenna unit at the illustrated 150 MHZ radio frequency are received by the antenna of the adapter unit. The antenna is preferably a modified loop embedded in the adapter case, although several other types noted earlier could be used. The antenna feeds the electronics consisting of one to three chips [i.e., these integrated circuits may be combined as may be economically effective using VLSI (Very Large Scale Integration) techniques]. The chips contain a radio frequency amplifier which is fed by the antenna and operates in this example at 150 MHZ. Since, in this embodiment, the frequency translation of the transmissions to the operating frequency of the demodulators (which is 150 MHZ) of the adapter unit was accomplished in the antenna unit, no further frequency translation is required, and the radio frequency amplifier's output is split in half. The resultant signals drive the two demodulators shown in FIG. 1B. The preferred embodiment uses two channel diversity, and the demodulated signals are then sent to the demultiplexers.

The demultiplexers choose the program channel selected by the operator from those channels available. Assuming both space and time diversity are employed, one of the demultiplexer outputs also incorporates a buffer as shown in FIG. 1B to delay one of the received signals by the amount of time diversity designed into the system. The demultiplexer also removes the program information from the program channel selected, such as channel number, program type, performer, etc., and sends this information to the display. Alternatively, these data can be provided by a service channel devoted to such information. The outputs of the demultiplexers are brought into phase with each other by automatic adjustment of either short timing buffers, when interleaving is used, or long timing buffers when time diversity is employed. The outputs are then summed using a maximal ratio combiner or, alternatively, the stronger signal is selected. Though transmissions are digital in preferred embodiments, analog transmission is feasible. If digital, the program channel output from the combiner/selector is fed to a digital-to-analog converter.

The analog signal is amplified, frequency modulated and transmitted at one or more frequencies in the FM band (88–108 MHz) through an FM antenna in the adapter to the vehicle's FM radio receiving system so that the operator hears the selected program.

What is claimed is:

1. A radio receiver augmentation system for use in a vehicle with a standard FM radio receiver includes an adapter unit comprising a connector for connection to said vehicle's power system, and an antenna unit for mounting on said vehicle, said antenna unit comprising an antenna that can receive audio program signals having frequencies in the range of about 300 MHZ to about 4000 MHZ from a satellite system including at least one repeater at or near the earth's surface, and can re-radiate said signals, without demodulation, to said adapter unit, said antenna unit comprising a radio frequency translator and a radio frequency transmitter for transmitting translated, undemodulated signals to said adapter unit, said adapter unit including a display for audio program signals, an antenna for receiving audio program signals from said antenna unit, and a system for delivering a desired audio program signal to said FM radio receiver.

2. The system of claim 1 wherein the top of said antenna unit is a flat disc.

3. The system of claim 1 wherein said antenna unit includes a mounting plate, an arm that houses a re-radiator antenna, an electronics cone connected to said arm, and, connected to said electronics cone, solar cells and a satellite system receiving antenna.

4. The system of claim 1 wherein said connector on the adapter unit for connection to said vehicle power system is a plug for insertion into a cigarette lighter receptacle or into another power port.

5. A radio receiver augmentation system for use in a vehicle with a standard FM radio receiver includes an adapter unit comprising a connector for connection to said vehicle's power system, and an antenna unit for mounting on said vehicle, said antenna unit comprising an antenna that can receive audio program signals having frequencies in the range of about 300 about 4000 MHZ from a satellite system including at least one repeater at or near the earth's surface, and can re-radiate said signals, without demodulation, to said adapter unit, and connected to said antenna, a radio frequency translator and a radio frequency transmitter, that transmits translated, undemodulated radio broadcast signals to said adapter unit, said adapter unit including a display for audio program signals, an antenna for receiving audio program signals from said antenna unit, and a system for delivering a desired audio program signal to said FM radio receiver.

6. The system of claim 5 wherein the top of said antenna unit has the size and shape of a flat disc for receiving said audio program signals from said at least one satellite, said at least one repeater, or both.

7. The system of claim 5 wherein said antenna unit includes a mounting plate, an arm that houses a re-radiator antenna, an electronics cone connected to said arm and, connected to said electronics cone, solar cells and a satellite system receiving antenna.

8. The system of claim 5 wherein said connector on the adapter unit for connection to said vehicle power system is a plug for insertion into a cigarette lighter receptacle or auxiliary power port.

9. The system of claim 1 or claim 5 wherein the FM transmitter in the adapter is automatically tuned to a vacant portion of the FM radio spectrum and re-tuned if the vacant portion no longer is vacant by inclusion of an FM receiver and appropriate selectors in the adapter to find and monitor a vacant portion of the FM spectrum and tune the FM transmitter automatically to that portion of the frequency band.

10. A radio receiver augmentation system for use in a vehicle with a standard FM radio receiver includes an adapter unit comprising a connector for connection to said vehicle's power system, and an antenna unit for mounting on said vehicle, said antenna unit comprising an antenna that can receive audio program signals having frequencies in the range of about 300 MHZ to about 4000 MHZ from a satellite system including at least one repeater at or near the earth's surface, and can re-radiate said signals to said adapter unit, said antenna unit comprising a radio frequency translator and a radio frequency transmitter for transmitting translated signals to said adapter unit, said adapter unit including a display for audio program signals, an antenna for receiving audio program signals from said antenna unit, and a system for delivering a desired audio program signal to said FM radio receiver, wherein said FM transmitter in said adapter is automatically tuned to a vacant portion of the FM radio spectrum and re-tuned if the vacant portion no longer is vacant by inclusion of an FM receiver and appropriate selectors in the adapter to find and monitor a vacant portion of the FM spectrum and tune the FM transmitter automatically to that portion of the frequency band.

11. A radio receiver augmentation system for use in a vehicle with a standard FM radio receiver includes an adapter unit comprising an FM transmitter, a connector for connection to said vehicle's power system, and an antenna unit for mounting on said vehicle, said antenna unit comprising an antenna that can receive audio program signals having frequencies in the range of about 300 to about 4000 MHZ from a satellite system including at least one repeater at or near the earth's surface, and can re-radiate said signals to said adapter unit, and connected to said antenna, a radio frequency translator and a radio frequency transmitter, that transmits translated radio broadcast signals to said adapter unit, said adapter unit including a display for audio program signals, an antenna for receiving audio program signals from said antenna unit, and a system for delivering a desired audio program signal to said FM radio receiver, wherein said FM transmitter in said adapter is automatically tuned to a vacant portion of the FM radio spectrum and retuned if the vacant portion no longer is vacant by inclusion of an FM receiver and appropriate selectors in the adapter to find and monitor a vacant portion of the FM spectrum and tune the FM transmitter automatically to that portion of the frequency band.

12. A radio receiver augmentation system for use in a vehicle with a standard FM radio receiver includes an adapter unit comprising a connector for connection to said vehicle's power system, and an antenna unit for mounting on said vehicle, said antenna unit comprising an antenna that can receive audio program signals having frequencies in the range of about 300 MHZ to about 4000 MHZ from a satellite system including at least one repeater at or near the earth's surface, and can re-radiate said signals, without demodulation, to said adapter unit, said antenna unit comprising a radio frequency translator and a radio frequency transmitter for transmitting translated, undemodulated signals to said adapter unit, said adapter unit including a display for audio program signals, an antenna for receiving audio program signals from said antenna unit, and a system for delivering a desired audio program signal to said FM radio receiver, said antenna unit including a re-radiator antenna and a satellite system receiving antenna.

13. The system of claim 12 wherein said antenna unit also includes a mounting plate and an arm that houses said re-radiator antenna.

14. The system of claim 13 wherein said antenna unit further comprises an electronics cone connected to said arm, and solar cells connected to said electronics cone.

15. A radio receiver augmentation system for use in a vehicle with a standard FM radio receiver includes an adapter unit comprising a connector for connection to said vehicle's power system, and an antenna unit for mounting on said vehicle, said antenna unit comprising an antenna that can receive audio program signals having frequencies in the range of about 300 MHZ to about 4000 MHZ from a satellite system including at least one repeater at or near the earth's surface, and can re-radiate said signals, without demodulation, to said adapter unit, said antenna unit comprising a radio frequency translator and a radio frequency transmitter for transmitting translated, undemodulated signals to said adapter unit, said adapter unit including a display for audio program signals, an antenna for receiving audio program signals from said antenna unit, and a system for delivering a desired audio program signal to said FM radio receiver, said antenna unit including a re-radiator antenna, and a satellite system receiving antenna.

16. The system of claim 15 wherein said antenna unit also includes a mounting plate and an arm that houses said re-radiator antenna.

17. The system of claim 16 wherein said antenna unit further comprises an electronics cone connected to said arm, and solar cells connected to said electronics cone.

* * * * *